US012810655B2

(12) United States Patent
Yoshihara et al.

(10) Patent No.: US 12,810,655 B2
(45) Date of Patent: Nov. 24, 2026

(54) FACE REGISTRATION CONTROLLER FOR VEHICLE AND FACE REGISTRATION CONTROL METHOD FOR VEHICLE

(71) Applicant: DENSO CORPORATION, Kariya City (JP)

(72) Inventors: Daiki Yoshihara, Kariya City (JP); Shiro Nakamura, Kariya City (JP); Yuki Fujisawa, Kariya City (JP)

(73) Assignee: DENSO CORPORATION, Kariya-city (JP)

( * ) Notice: Subject to any disclaimer, the term of this patent is extended or adjusted under 35 U.S.C. 154(b) by 198 days.

(21) Appl. No.: 18/806,434

(22) Filed: Aug. 15, 2024

(65) Prior Publication Data

US 2024/0412564 A1 Dec. 12, 2024

Related U.S. Application Data

(63) Continuation of application No. PCT/JP2023/003998, filed on Feb. 7, 2023.

(30) Foreign Application Priority Data

Feb. 17, 2022 (JP) ................................ 2022-023246

(51) Int. Cl.
*G06V 40/50* (2022.01)
*G06V 10/70* (2022.01)
(Continued)

(52) U.S. Cl.
CPC .............. *G06V 40/50* (2022.01); *G06V 10/70* (2022.01); *G06V 10/993* (2022.01); *G06V 20/59* (2022.01); *G06V 40/172* (2022.01)

(58) Field of Classification Search
CPC ...... G06V 40/50; G06V 10/70; G06V 10/993; G06V 20/59; G06V 40/172; G06V 40/16; G06T 7/00
See application file for complete search history.

(56) References Cited

U.S. PATENT DOCUMENTS

| | | | | |
|---|---|---|---|---|
| 8,570,391 | B2 * | 10/2013 | Shimamura | H04N 23/611 348/222.1 |
| 9,298,969 | B2 * | 3/2016 | Sako | G06F 21/6245 |

(Continued)

FOREIGN PATENT DOCUMENTS

| | | | |
|---|---|---|---|
| JP | 2005-149370 | A | 6/2005 |
| JP | 2019-028959 | A | 2/2019 |
| JP | 2019-168929 | A | 10/2019 |

*Primary Examiner* — Tom Y Lu
(74) *Attorney, Agent, or Firm* — Precision Patents, P.C.

(57) ABSTRACT

A face registration controller includes a face image obtaining unit, an adverse condition determination unit, a notification control unit, and a registration unit. The face image obtaining unit obtains a face image of an occupant. The adverse condition determination unit determines whether the face image falls within one of adverse conditions for a face authentication and identify a type of the one of the adverse conditions. The notification control unit notifies, when the face image falls within the one of the adverse conditions, at least one of the type of the one of the adverse conditions and a solution devised in accordance with the type. The registration unit resisters the face image as an authentication image when the face image does not fall within the adverse conditions and refrains from registering the face image when the face image falls within the adverse conditions.

10 Claims, 2 Drawing Sheets

(51) Int. Cl.

| | |
|---|---|
| ***G06V 10/98*** | (2022.01) |
| ***G06V 20/59*** | (2022.01) |
| ***G06V 40/16*** | (2022.01) |

(56) References Cited

U.S. PATENT DOCUMENTS

| | | | | |
|---|---|---|---|---|
| 2009/0252383 | A1* | 10/2009 | Adam .................... | G06V 40/16<br>715/810 |
| 2016/0267339 | A1* | 9/2016 | Nakano ................ | G06V 40/173 |
| 2020/0175261 | A1* | 6/2020 | Shimizu .................. | G06F 21/32 |
| 2021/0224521 | A1 | 7/2021 | Nozue et al. | |

* cited by examiner

FACE REGISTRATION CONTROLLER FOR VEHICLE AND FACE REGISTRATION CONTROL METHOD FOR VEHICLE

CROSS REFERENCE TO RELATED APPLICATIONS

The present application is a continuation application of International Patent Application No. PCT/JP2023/003998 filed on Feb. 7, 2023, which designated the U.S. and claims the benefit of priority from Japanese Patent Application No. 2022-023246 filed on Feb. 17, 2022. The entire disclosures of all of the above applications are incorporated herein by reference.

TECHNICAL FIELD

The present disclosure relates to a face registration controller for a vehicle and a face registration control method for a vehicle.

BACKGROUND

There is a face authentication that a captured face image is compared with a registered face image to authenticate a formal user.

SUMMARY

A face registration controller registers a face image of an occupant in the vehicle for a face authentication. The face registration controller includes a face image obtaining unit, an adverse condition determination unit, a notification control unit, and a registration unit. The face image obtaining unit is configured to obtain the face image of the occupant that is captured by an imaging device used in the vehicle. The adverse condition determination unit is configured to determine whether the face image obtained by the face image obtaining unit falls within one of adverse conditions. Each of the adverse conditions is a predetermined inappropriate image category for the face authentication. The adverse condition determination unit is configured to identify a type of the one of the adverse conditions. The notification control unit is configured to perform, when the adverse condition determination unit determines that the face image obtained by the face image obtaining unit falls within the one of the adverse conditions, at least one of: (i) notifying the occupant of the type of the one of the adverse conditions within which the face image falls, and (ii) notifying the occupant of a solution devised in accordance with the type of the one of the adverse conditions. The registration unit is configured to (i) resister the face image obtained by the face image obtaining unit as an authentication image used for the face authentication when the adverse condition determination unit determines that the face image does not fall within any one of the adverse conditions, and (ii) refrain from registering the face image obtained by the face image obtaining unit as the authentication image when the adverse condition determination unit determines that the face image falls within one of the adverse conditions.

A face registration control method for a vehicle to register a face image of an occupant in the vehicle is provided. The face image is used for a face authentication of the occupant. The method is executed by at least one of a processor and includes (i) obtaining the face image of the occupant that is captured by an imaging device in the vehicle, (ii) determining whether the face image falls within one of adverse conditions each of which is a predetermined inappropriate image category for the face authentication and identifying a type of the one of the adverse conditions within which the face image falls, (iii) notifying the occupant of at least one of the type of the one of the adverse conditions and a solution devised in accordance with the type of the one of the adverse conditions when determining that the face image falls within the adverse conditions, (iv) registering the face image as an authentication image for the face authentication when determining that the face image does not fall within any one of the adverse conditions, and (v) refraining from registering the face image as the authentication image when determining that the face image falls within the one of the adverse conditions.

EMBODIMENTS FOR IMPLEMENTING INVENTION

Figure 1:
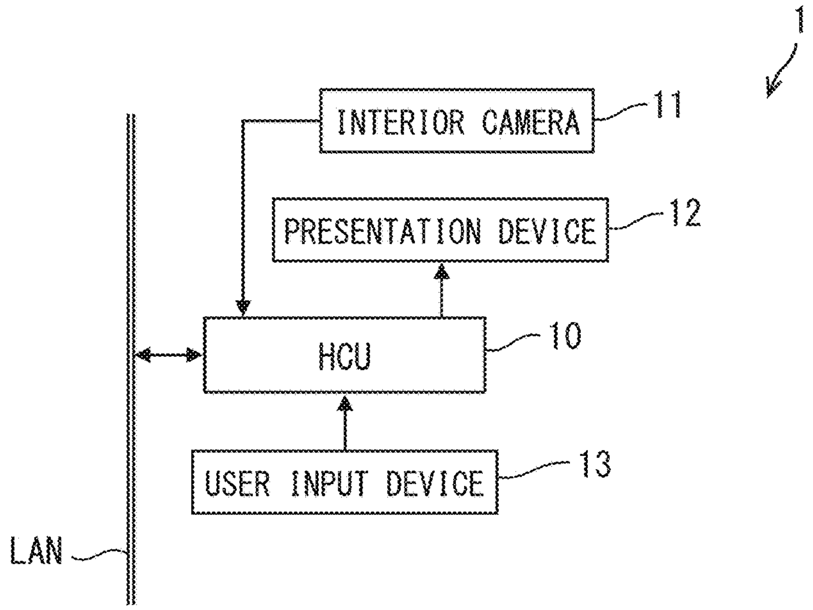
FIG. 1 is a schematic diagram illustrating a configuration of a vehicle system.

To begin with, examples of relevant techniques will be described.

There is a face authentication that a captured face image is compared with a registered face image to authenticate a formal user. For example, there is a technique to divide a captured face image into three regions, upper, middle, and lower, and authenticate each region for a problem that authentication fails because the captured image includes a hidden part of the face of a person to be authenticated. Face authentication succeeds if authentication is successful in all three regions. The operator is instructed to take a face image again when authentication fails for one of the three regions and succeeds for the other two regions.

The technique works under the assumption that the preregistered face image is appropriate for authentication. However, when a face image for authentication is automatically registered in a vehicle system, an inappropriate face image may be registered as the face image for authentication. An example of the inappropriate face image for authentication is a face image in which a part of the face is hidden by an object or lighting. If such inappropriate face image is registered as a face image for authentication, the face image cannot be authenticated accurately. If the user cannot recognize what is inappropriate and why the face image cannot be registered, it takes a lot of time and effort to register the face image.

It is an objective of the present disclosure to provide a face registration controller for a vehicle and a face registration control method for a vehicle that enable a user to register face images that achieve more accurate authentication while reducing the effort required for registration, even when the face images for authentication are registered automatically.

The above objective is achieved by the combination of features described in the independent claims, and the dependent claims define further advantageous specific examples of the disclosure. Here, a reference numeral in parentheses in claims indicate a correspondence relationship with specific means described in embodiments to be described later as one aspect and does not limit the technical scope of the present disclosure.

In order to achieve the above objective, the present disclosure provides a face registration controller for a vehicle. The face registration controller registers a face image of an occupant in the vehicle for a face authentication. The face registration controller includes a face image obtaining unit, an adverse condition determination unit, a notification control unit, and a registration unit. The face image obtaining unit is configured to obtain the face image of the occupant that is captured by an imaging device used in the vehicle. The adverse condition determination unit is configured to determine whether the face image obtained by the face image obtaining unit falls within one of adverse conditions. Each of the adverse conditions is a predetermined inappropriate image category for the face authentication. The adverse condition determination unit is configured to identify a type of the one of the adverse conditions. The notification control unit is configured to perform, when the adverse condition determination unit determines that the face image obtained by the face image obtaining unit falls within the one of the adverse conditions, at least one of: (i) notifying the occupant of the type of the one of the adverse conditions within which the face image falls, and (ii) notifying the occupant of a solution devised in accordance with the type of the one of the adverse conditions. The registration unit is configured to (i) resister the face image obtained by the face image obtaining unit as an authentication image used for the face authentication when the adverse condition determination unit determines that the face image does not fall within any one of the adverse conditions, and (ii) refrain from registering the face image obtained by the face image obtaining unit as the authentication image when the adverse condition determination unit determines that the face image falls within one of the adverse conditions.

In order to achieve the above objective, the present disclosure provides a face registration control method for a vehicle to register a face image of an occupant in the vehicle. The face image is used for a face authentication of the occupant. The method is executed by at least one of a processor and includes (i) obtaining the face image of the occupant that is captured by an imaging device in the vehicle, (ii) determining whether the face image falls within one of adverse conditions each of which is a predetermined inappropriate image category for the face authentication and identifying a type of the one of the adverse conditions within which the face image falls, (iii) notifying the occupant of at least one of the type of the one of the adverse conditions and a solution devised in accordance with the type of the one of the adverse conditions when determining that the face image falls within the adverse conditions, (iv) registering the face image as an authentication image for the face authentication when determining that the face image does not fall within any one of the adverse conditions, and (v) refraining from registering the face image as the authentication image when determining that the face image falls within the one of the adverse conditions.

According to the above configuration, when it is determined that the face image of an occupant captured by the imaging device falls within any types of adverse conditions that are inappropriate image categories for face authentication, the face image is prevented from being registered as an authentication image. This prevents an inappropriate face image from being registered as an authentication face image, thereby enabling more accurate authentication. In addition, when it is determined that the face image of the occupant captured by the imaging device falls within any types of adverse conditions that are inappropriate image categories for face authentication, at least one of a notification indicating the type of the adverse conditions within which the face image falls and a notification indicating a solution devised in accordance with the type of the adverse conditions is presented. Thus, the occupant who receives this notification can know the reason the face image registration has failed and the solution for successful face image registration. Therefore, even when the face image registration initially fails, the present disclosure can lead the occupant to successful face image registration more easily. As a result, even when a face image for authentication is automatically registered, registration of a face image that enables more accurate authentication can be achieved while reducing the effort required for registration.

Multiple embodiments will be described with reference to the drawings. For convenience of explanation, portions having the same functions as those illustrated in the drawings used in the description among embodiments are assigned the same reference symbol, and descriptions of the same portions may be omitted. Descriptions in another embodiment may be applied for the portions assigned the same reference symbol.

First Embodiment

<Schematic Configuration of Vehicle System 1>

Hereinafter, a first embodiment of the present disclosure will be described with reference to the drawings. A vehicle system 1 shown in FIG. 1 can be used for a vehicle. As illustrated in FIG. 1, the vehicle system 1 includes an HCU 10 (i.e., Human Machine Interface Control Unit), an interior camera 11, a presentation device 12, and a user input device 13. For example, the HCU 10 may be connected to an in-vehicle LAN (see the LAN in FIG. 1). Although the vehicle including the vehicle system 1 is not necessarily limited to an automobile, a case where the vehicle system 1 is used in an automobile will be described below as an example.

The interior camera 11 captures an image of a predetermined range in the vehicle compartment of the subject vehicle. This interior camera 11 corresponds to an imaging device. It may be preferable that the interior camera 11 captures the range including the driver seat of the subject vehicle at least. The interior camera 11 may capture an image in an area including the passenger seat, and the rear seat of the subject vehicle in addition to the driver seat. The interior camera 11 may be configured by a near-infrared light source, a near-infrared camera, and a control unit that controls these components. The interior camera 11 irradiates the occupant in the subject vehicle with the near-infrared light from the near-infrared light source and captures an image of the occupant with the near-infrared camera.

The subject vehicle includes a presentation device 21 that presents information toward the interior of the subject vehicle. In other words, the presentation device 21 issues notification for the occupants in the subject vehicle. The presentation device 21 issues notification under the control of the HCU 10. Examples of the presentation device 21 include a display device and an audio output device.

The display device provides notification by displaying information. The display device may be a meter MID (Multi Information Display), CID (Center Information Display), HUD (Head-Up Display). The audio output device performs notification by outputting audio. Examples of the audio output device include a speaker.

The meter MID is a display device located in front of the driver seat in the vehicle compartment. As an example, the meter MID may be provided on a meter panel. The CID is a display device located at the center of an instrument panel of the subject vehicle. The HUD is provided in, for example, the instrument panel in the vehicle compartment. The HUD projects a display image formed by a projector onto a projection region defined on the front windshield serving as a projection member. A light of the display image reflected by the front windshield to the inside of the subject vehicle is perceived by the driver seated in the driver's seat. As a result, the driver can visually recognize a virtual image of the display image formed in front of the front windshield so as to overlap with a part of the landscape in front of the vehicle. The HUD may be configured to project the display image onto a combiner provided in front of the driver's seat instead of the front windshield.

The user input device 13 accepts input from the user. The user input device 13 may be an operation device that receives operation input from the user. The operation device may be a mechanical switch, or a touch switch integrated with the display device such as CID. The user input device 13 is not limited to the operation device that accepts the operation input as long as the user input device 13 is a device that accepts input from the user. For example, the user input device 13 may be an audio input device that receives command input by an audio such as a voice from the user.

The HCU 10 mainly includes a computer including a processor, a volatile memory, a non-volatile memory, an I/O, and a bus connecting these devices. The HCU 10 is connected to the interior camera 11, the presentation device 12, and the user input device 13. The HCU 10 executes a process related to registration of face image for face authentication (hereinafter, referred to as a face registration-related process) by executing a control program stored in the non-volatile memory. The HCU 10 corresponds to a face registration controller for a vehicle. The configuration of the HCU 10 will be described in detail below.

<Schematic Configuration of HCU 10>

Figure 2:
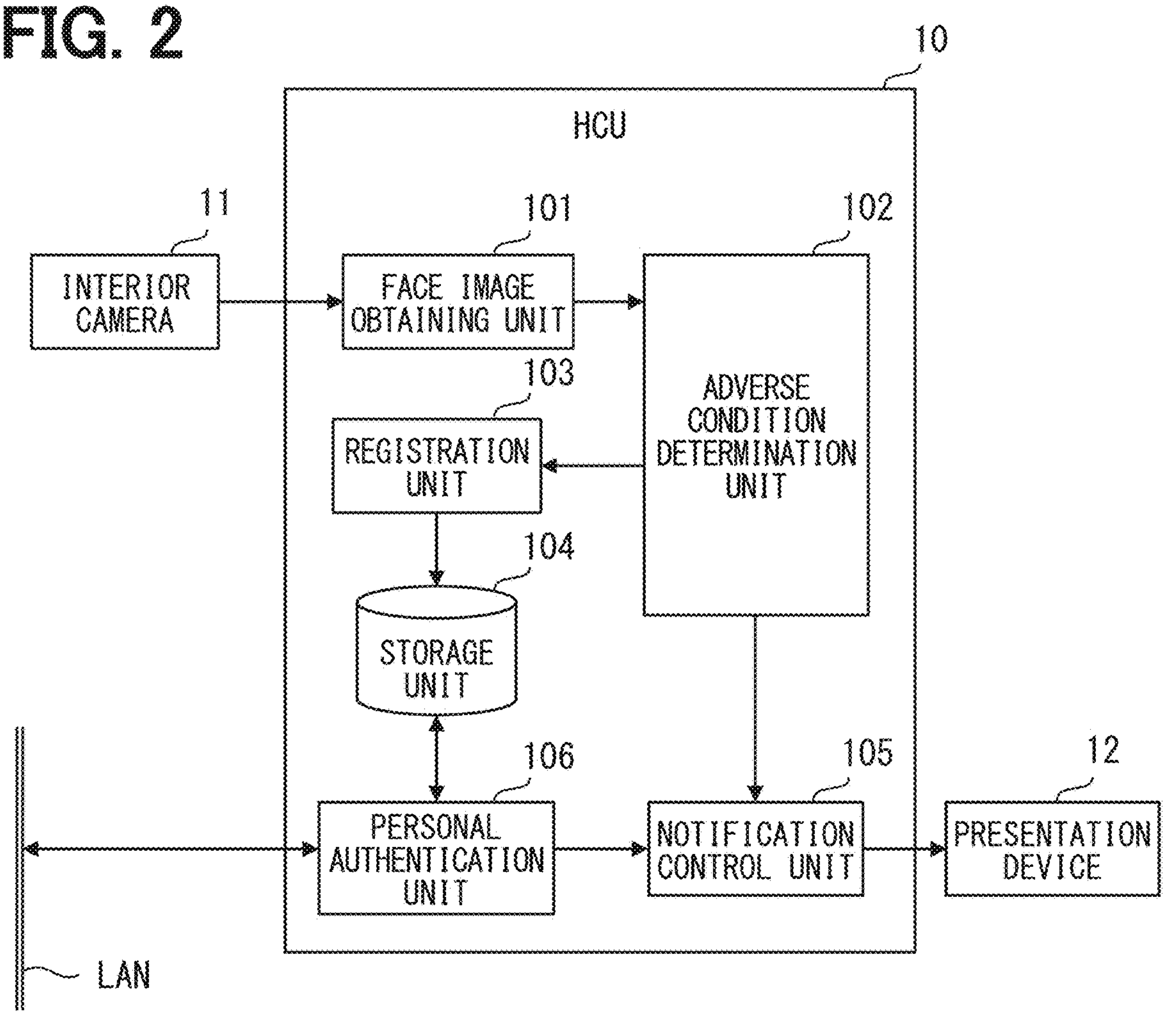
FIG. 2 is a schematic diagram illustrating an example of a configuration of an HCU.

A schematic configuration of the HCU 10 will be described with reference to FIG. 2. As shown in FIG. 2, the HCU 10 includes a face image obtaining unit 101, an adverse condition determination unit 102, a registration unit 103, a storage unit 104, a notification control unit 105, and a personal authentication unit 106 as functional blocks. Execution of a process of each functional block of the HCU 10 by a computer corresponds to execution of a face registration control method for a vehicle. Some or all of the functions executed by the HCU 10 may be implemented by hardware including one or more ICs. Alternatively, some or all of the functions executed by the HCU 10 may be implemented by a combination of execution of software by the processor and a hardware device.

The face image obtaining unit 101 obtains a face image of the occupant in the subject vehicle that is captured by the interior camera 11 used in the subject vehicle.

This process by the face image obtaining unit 101 corresponds to a face image obtaining step. The occupant whose face image is to be captured may be limited to the driver or may not be limited to the driver. In this embodiment, a case where a face image of the driver is obtained will be described as an example.

The adverse condition determination unit 102 determines, based on the face image obtained by the face image obtaining unit 101, whether the face image falls within one of adverse conditions. Each of the adverse conditions is a predetermined inappropriate image category for face authentication. The adverse condition determination unit 102 even distinguishes types of the adverse conditions and identifies which type of the adverse conditions the face image corresponds falls within.

The process in the adverse condition determination unit 102 corresponds to an adverse condition determination step. The adverse condition determination unit 102 may use a learning device that has been trained in advance to distinguish between the types of the adverse conditions to identify which type of the adverse conditions inappropriate for face authentication the face image obtained by the face image obtaining unit 101 falls within. The learning may be performed using machine learning. As machine learning, deep learning may be used.

It is preferable that the adverse condition determination unit 102 determines whether the occupant wears a mask as a type of one of the adverse conditions. In this case, the adverse condition determination unit 102 may make the determination using a learning device that has performed machine learning in advance using, for example, images of people wearing masks. In addition, when the adverse condition determination unit 102 does not use a learning device, the adverse condition determination unit 102 may determine whether the occupant wears a mask based on a distribution of luminance that is characteristic of an image of a person wearing a mask.

It is preferable that the adverse condition determination unit 102 determines whether the occupant wears an item that covers the neck of the occupant (hereinafter, referred to as a specific item) as a type of one of the adverse conditions. Examples of the specific item include neck warmers and hijabs. In this case, the adverse condition determination unit 102 may make the determination using a learning device that has performed machine learning in advance using, for example, images of people wearing the specific item. In addition, when the adverse condition determination unit 102 does not use a learning device, the adverse condition determination unit 102 may determine whether the occupant wears a specific item based on a distribution of luminance that is characteristic of an image of a person wearing the specific item.

It is preferable that the adverse condition determination unit 102 determines whether the occupant wears sunglasses as a type of one of the adverse conditions. In this case, the adverse condition determination unit 102 may make the determination using a learning device that has performed machine learning in advance using, for example, images of people wearing sunglasses. In addition, when the adverse condition determination unit 102 does not use a learning device, the adverse condition determination unit 102 may determine whether the occupant wears sunglasses based on a distribution of luminance that is characteristic of an image of a person wearing sunglasses.

It is preferable that the adverse condition determination unit 102 determine whether a shadow is cast on the face of the occupant (hereinafter, referred to as "shadow cast" as a type of one of the adverse conditions. Further, it is preferable that the adverse condition determination unit 102 even determines which area of the occupant's face is cast in shadow. In this case, the adverse condition determination unit 102 may make the determination using a learning device that has performed machine learning in advance using, for example, images of people with shadow on their faces. The shadow referred to here may be defined as a shadow having a density and range in which the probability of face authentication failure is equal to or exceeds a specified rate. The specified rate herein can be set appropriately. For determining which area of the occupant's face is in shadow, a learning device that has performed machine learning on each area that is cast in shadow can be used. In addition, when the adverse condition determination unit 102 does not use a learning device, the adverse condition determination unit 102 may determine which area of the occupant's face is in shadow based on the distribution of luminance in the face image below a threshold in a certain range. The threshold and the certain range referred to here may be set to values corresponding to the darkness and range of the shadow at which the probability of face authentication failure is estimated to be equal to or higher than a specified rate. For simplification, the shaded area may be consolidated into, for example, a few divisions.

It is preferable that the adverse condition determination unit 102 recognize blown-out highlights in the face image as a type of one of the adverse conditions. Blown-out highlights refer to a state in which the brightness of an image reaches the upper limit of what a computer can express. Blown-out highlights refer to a state in which the value of an index indicating the brightness of an image reaches a maximum brightness. In this case, the adverse condition determination unit 102 may make the determination using a learning device that has performed machine learning in advance using, for example, face images having blown-out highlights. When the adverse condition determination unit 102 does not use a learning device, the adverse condition determination unit 102 may recognize blown-out highlights based on the distribution of areas with maximum luminance in a face image. The blown-out highlights may be limited to a size equal to or larger than a certain range. The certain range referred to here may be a range in which the probability of face authentication failure is estimated to be equal to or greater than a specified rate.

It is preferable that the adverse condition determination unit 102 determine whether a face direction of the occupant in the face image is outside an allowable range as a type of one of the adverse conditions. In this case, the adverse condition determination unit 102 may make the determination using a learning device that has performed machine learning in advance using, for example, face images with face directions outside the allowable range. The term "outside the allowable range" may refer to a face direction within a range in which the probability of face authentication failure is estimated to be equal to or greater than a specified rate. In addition, when the adverse condition determination unit 102 does not use a learning device, for example, the adverse condition determination unit 102 may determine that the face direction of the occupant in the face image is outside the specified range when the face direction of the occupant that can be detected from the face image is outside the specified range. The face direction in the face image may be detected based on the relative positional relationship of parts such as the eyes, nose, and mouth extracted from the face image.

The adverse condition determination unit 102 may be determine other adverse conditions without being limited to the above-mentioned examples of the adverse conditions. For example, the occupant wearing a hat may be determined as one type of the adverse conditions.

The registration unit 103 registers the face image obtained by the face image obtaining unit 101 as an authentication image, which is a face image used for face authentication. The registration unit 103 may register the authentication image by storing it in the storage unit 104. The storage unit 104 may be an electrically rewritable non-volatile memory. When the adverse condition determination unit 102 determines that the face image obtained by the face image obtaining unit 101 does not fall within any one of the adverse conditions, the registration unit 103 registers the face image as an authentication image. Contrary, when the adverse condition determination unit 102 determines that the face image obtained by the face image obtaining unit 101 falls within the adverse conditions, the registration unit 103 refrains from registering the face image as an authentication image. The process in the registration unit 103 corresponds to a registration step.

The notification control unit 105 controls the presentation device 12. The notification control unit 105 causes the presentation device 12 to issue a notification. When the adverse condition determination unit 102 determines that the face image obtained by the face image obtaining unit 101 falls within the adverse conditions, the notification control unit 105 causes the presentation device 12 to present at least one of a notification indicating the type of the one of the adverse conditions within which the face image falls (hereinafter, a failure cause notification) and a notification indicating a solution devised in accordance with the type of the one of the adverse conditions within which the face image falls (hereinafter, a solution notification). The process in the notification control unit 105 corresponds to a notification control step. The failure cause notification and the solution notification may be made by icon display, text display, or audio output.

When the adverse condition determination unit 102 determines that the face image obtained by the face image obtaining unit 101 falls within one of the adverse conditions that the occupant wears a mask, the notification control unit 105 makes the following notification. The notification control unit 105 may notify the occupant that the occupant wears a mask as the failure cause notification. According to this, when face image registration fails due to wearing a mask, the occupant can recognize that wearing a mask causes the failure. The notification control unit 105 may request the occupant to remove the mask as a solution notification. This allows the occupant to recognize more easily what to do for success in the registration when the face image registration fails due to wearing a mask.

When the adverse condition determination unit 102 determines that the face image obtained by the face image obtaining unit 101 falls within the wearing of the specific item among the adverse conditions, the notification control unit 105 makes the following notification. The notification control unit 105 may notify the occupant that the occupant wears a specific item as the failure cause notification. According to this, when the face image registration fails due to the wearing of the specific item, the occupant can recognize that the wearing of the specific item causes the failure. The notification control unit 105 may request the occupant to remove the specific item as a solution notification. This allows the occupant to recognize more easily what to do for success in the registration when the face image registration fails due to the wearing of the specific item.

When the adverse condition determination unit 102 determines that the face image obtained by the face image obtaining unit 101 falls within one of the adverse conditions that the occupant wears sunglasses, the notification control unit 105 makes the following notification. The notification control unit 105 may notify the occupant that the occupant wears sunglasses as the failure cause notification. According to this, when the face image registration fails due to the wearing of sunglasses, the occupant can recognize that the wearing sunglasses causes the failure. As a solution notification, the notification control unit 105 may request the occupant to remove the sunglasses. This allows the occupant to recognize more easily what to do for success in the registration when wearing sunglasses causes the failure of the face image registration.

When the adverse condition determination unit 102 determines that the face image obtained by the face image obtaining unit 101 contains a shadow cast, the notification control unit 105 makes the following notification. The notification control unit 105 makes notification indicating that the occupant face is cast in a shadow. In this case, the notification may also indicate which area of the occupant's face is cast in a shadow. As a specific example, the notification control unit 105 causes the display device to display the face image obtained by the face image obtaining unit 101 and to highlight a shaded area of the face image. According to this, when the face image registration fails due to the shadow cast, the occupant can recognize that the adverse condition of the occupant face being cast in a shadow causes the failure. Notification of a shaded area of the occupant's face enables the occupant to recognize more easily what to do for successful registration. The notification control unit 105 may request the occupant to remove an object between the interior camera 11 and the occupant's face as the solution notification in addition to the notification of indicating the shaded area of the occupant's face. This allows the occupant to recognize more easily what to do for success in the registration when the shadow cast causes the failure of the face image registration.

When the adverse condition determination unit 102 determines that the face image obtained by the face image obtaining unit 101 includes blown-out highlights, the notification control unit 105 makes the following notification. The notification control unit 105 may notify the occupant of the blown-out highlights as the failure cause notification. According to this, when the registration of the face image fails due to the blown-out highlights, the occupant can recognize that the blown-out highlights in the face image causes the failure. The notification control unit 105 may request the occupant to use the sun visor of the vehicle to block external light as the solution notification. This allows the occupant to recognize more easily what to do for success in the registration when the registration of a face image fails due to blown-out highlights.

When the adverse condition determination unit 102 determines that the face image obtained by the face image obtaining unit 101 falls within an image with a face direction outside the allowable range, the notification control unit 105 makes the following notification. The notification control unit 105 may notify the occupant that the face direction in the face image is outside the allowable range. According to this, when the face image registration fails because the face direction in the face image is outside the allowable range, the occupant can recognize that the face direction in the image outside the allowable range causes the failure. The notification control unit 105 may notify the occupant to take an image again with the face direction within the allowable range. As an example, the notification control unit 105 may cause the interior camera 11 to display the instruction to face forward.

The personal authentication unit 106 performs face authentication. The personal authentication unit 106 compares the face image obtained by the face image obtaining unit 101 with the authentication image registered in the storage unit 104. The personal authentication unit 106 may perform matching based on the degree of similarity of the shapes of characteristic parts such as the eyes, nose, and mouth, the contours of the face, and the positional relationships between the characteristic parts. The personal authentication unit 106 may establish face authentication if the degree of similarity with the authentication image is equal to or greater than a threshold. Contrary, when the degree of similarity with the authentication image is less than the threshold, face authentication should not be established. The threshold mentioned here can be arbitrarily set.

When face authentication is successful, the personal authentication unit 106 may let the occupant who succeeds in face authentication adjust personalized vehicle settings according to the occupant via the in-vehicle LAN. Examples of the personalized vehicle settings include personalized seat adjustments and air conditioning settings.

<Face Registration-Related Process by HCU 10>

Here, an example of the flow of the face registration-related process in the HCU 10 will be described with reference to the flowchart of FIG. 3. The flowchart of FIG. 3 may be started, for example, at a detection of opening/closing of the driver's door of the vehicle and a detection of a person sitting on the driver's seat. The opening and closing of the driver's door can be detected from a signal from a door courtesy switch. The seating on the driver's seat can be detected from a signal from a seating sensor provided in the driver's seat.

First, in step S1, the face image obtaining unit 101 obtains a face image of the driver of the subject vehicle that is captured by the interior camera 11. In step S2, the personal authentication unit 106 compares the face image obtained in S1 with an authentication image registered in the storage unit 104 for face authentication.

In S3, when the face authentication is successful (YES in S3), the process proceeds to S4. When the face authentication fails (NO in S3), the process proceeds to S5. In step S4, the personal authentication unit 106 allows the occupant to adjust personalized settings according to the individual who have succeeded in face authentication and ends the face registration-related process.

In step S5, when the adverse condition determination unit 102 determines that the face image obtained in S1 falls within the adverse condition that the driver wears an item, the process proceeds to step S6. Examples of the item include the above-mentioned masks, special items, and sunglasses. On the other hand, when the adverse condition determination unit 102 determines that the driver does not wear the item (NO in S5), the process proceeds to step S7.

In step S6, the notification control unit 105 makes a solution notification, and the process returns to S1 and is repeated. when the item is a mask, the notification control unit 105 issues a notification instructing the occupant to remove the mask. when the accessory is a specific item, the notification control unit 105 makes a notification instructing the user to remove the specific item. When the item is sunglasses, the notification control unit 105 makes a notification instructing the occupant to remove the sunglasses. The process may return from S6 to S1 after a certain period has elapsed since the issue of the solution notification to ensure time for the occupant to implement the solution.

In step S7, when the adverse condition determination unit 102 determines that the face image obtained in S1 corresponds to the adverse condition that the face direction of the occupant in the face image is outside the allowable range (YES in S7), the process proceeds to step S8. On the other hand, when the adverse condition determination unit 102 determines that the face direction in the face image is within the allowable range (NO in S7), the process proceeds to step S9. In step S8, the notification control unit 105 issues a solution notification, and the process returns to S1 and is repeated. The notification control unit 105 makes a notification instructing the occupant to take a face image in a face direction within the allowable range. The process may return from S8 to S1 after a certain period has elapsed since the issue of the solution notification.

In step S9, the adverse condition determination unit 102 determines the reliability of the face image obtained in S1. The reliability of the face image may be a value of the accuracy of the extracted parts such as the eyes, nose, mouth, face contour that are extracted from the face image using image recognition technology. The accuracy of the extracted parts decreases as the luminance of the image becomes too high or too low, or as a part of the extracted parts is missing. The adverse condition determination unit 102 may determine that the reliability of the face image is high when the value of the accuracy is equal to or greater than a threshold. The threshold mentioned here can be arbitrarily set. The control unit of the interior camera 11 may extract the parts such as the eyes, nose, mouth, face contour from the face image.

In step S9, when the reliability of the face image is high (YES in S9), the process proceeds to step S10. On the other hand, when the reliability of the face image is low (NO in S9), the process proceeds to step S11. When the reliability of the face image is low, it is determined that the face image falls within the above-mentioned blown-out highlights or shadow cast. In step S10, the registration unit 103 registers the face image obtained in S1 as an authentication image, and the face registration-related process ends.

In step S11, when the adverse condition determination unit 102 determines that the face image obtained in S1 includes the blown-out highlights as a type of one of the adverse conditions (YES in S11), the process proceeds to step S12. On the other hand, when it is determined that the face image obtained in S1 does not include the blown-out highlights, it is determined that the face image falls within the shadow cast, and the process proceeds to step S13. In this case, the adverse condition determination unit 102 also identifies areas of the occupant's face in shadow.

In step S12, the notification control unit 105 makes a solution notification, and the process returns to S1 and is repeated. The notification control unit 105 issues a notification instructing the occupant to use the sun visor of the vehicle to block external light. When returning from S12 to S1, the process may return to S1 after a certain period has elapsed since the issue of the solution notification.

In step S13, the notification control unit 105 makes a solution notification, and the process returns to S1 and is repeated. The notification control unit 105 notifies the occupant of the shaded area of the occupant's face and requests the occupant to remove an object between the interior camera 11 and the occupant's face. When returning from S12 to S1, the process may return to S1 after a certain period has elapsed since the issue of the solution notification.

The process of S9 may be omitted. In this case, the process may shift from S7 to S11. Also, when the result of S11 is NO and the adverse condition determination unit 102 determines that the face image falls within the shadow cast, the process may proceed to step S13. When the result of S11 is NO and the adverse condition determination unit 102 determines that the face image does not fall within the shadow cast, the process may return to S1 and be repeated. In this case, for example, the notification control unit 105 may notify the occupant that the cause of the failure in registering the face image is unknown.

Figure 3:
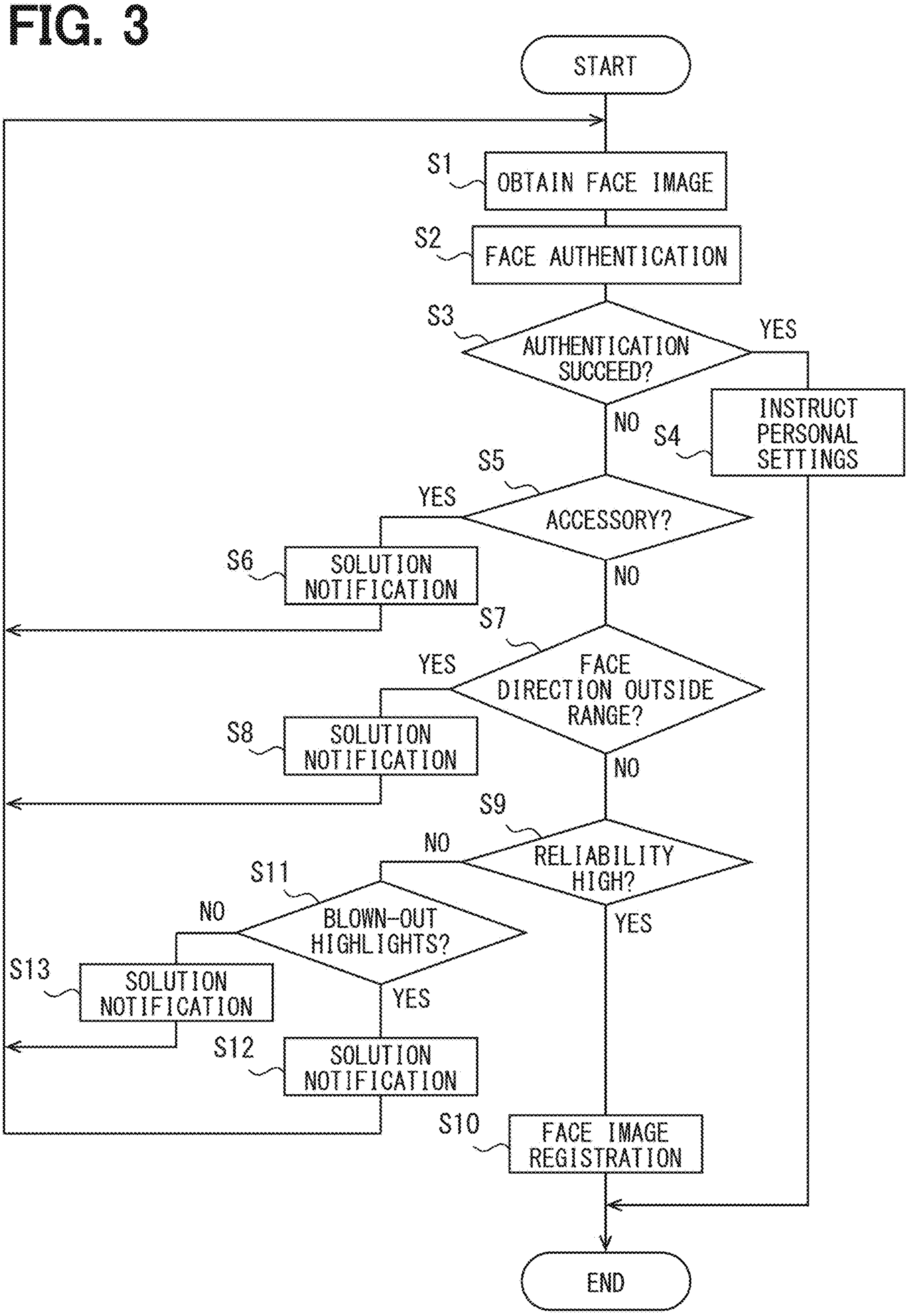
FIG. 3 is a flowchart illustrating a face registration-related process in the HCU.

In the example of FIG. 3, the face registration-related process is triggered by the detection of the opening and closing of the driver's door of the subject vehicle and the detection of a person sitting on the driver's seat, but the present disclosure is not limited to this. For example, the face registration-related process may be triggered by the input in the user input device 13 that requests face image registration. When this configuration is adopted, the processes of S2 to S4 in the flowchart of FIG. 3 may be omitted, and the process can shift from S1 to S5.

According to the configuration of the first embodiment, when the face image of the occupant captured by the interior camera 11 is included in the adverse conditions that are inappropriate for the face authentication, the face image is not registered as the authentication image. This prevents an inappropriate face image from being registered as an authentication face image, thereby enabling more accurate authentication. In addition, when it is determined that the face image of the occupant captured by the interior camera 11 is included in one of the types of the adverse conditions that are inappropriate for face authentication, at least one of a notification indicating the type of the adverse condition which the face image corresponds to and a notification indicating a solution to the type of the adverse conditions will be made. Thus, the occupant who receives this notification can know the reason the face image registration has failed and the solution for successful face image registration. Therefore, even when the face image registration initially fails, it is possible to lead to successful face image registration more easily. As a result, even when a face image for authentication is automatically registered, the present disclosure can lead to registration of a face image that enables more accurate authentication while reducing the effort required for registration.

Second Embodiment

In the first embodiment, the face registration-related process is performed by the HCU 10, but the present disclosure is not limited to this. For example, the face registration-related process may be performed by an electronic control device other than the HCU 10. In this case, the electronic control device other than the HCU 10 corresponds to a face registration controller for a vehicle.

The present disclosure is not limited to the embodiments described above, and various modifications are possible within the scope of the claims. An embodiment obtained by appropriately combining technical means disclosed in different embodiments is also included in the technical scope of the present disclosure. The control device and the control method described in the present disclosure may be implemented by a special purpose computer which includes a processor programmed to execute one or more functions executed by computer programs. Also, the device and the method therefor which have been described in the present disclosure may be also realized by a special purpose hardware logic circuit. Alternatively, the device and the method described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

The invention claimed is:

1. A face registration controller to register a face image of an occupant in a vehicle, the face image being used for a face authentication, the face registration controller comprising:

a face image obtaining unit configured to obtain the face image of the occupant that is captured by an imaging device in the vehicle;

an adverse condition determination unit configured to:

determine whether the face image obtained by the face image obtaining unit falls within one of a plurality of adverse conditions, each of the plurality of adverse conditions being a predetermined inappropriate image category for the face authentication; and identify a type of the one of the plurality of adverse conditions within which the face image falls;

a notification control unit configured to perform, when the adverse condition determination unit determines that the face image obtained by the face image obtaining unit falls within the one of the plurality of adverse conditions, at least one of:

notifying the occupant of the type of the one of the plurality of adverse conditions within which the face image falls; and notifying the occupant of a solution devised in accordance with the type of the one of the plurality of adverse conditions; and a registration unit configured to:

register the face image obtained by the face image obtaining unit as an authentication image for the face authentication when the adverse condition determination unit determines that the face image does not fall within any one of the plurality of adverse conditions; and refrain from registering the face image obtained by the face image obtaining unit as the authentication image when the adverse condition determination unit determines that the face image falls within one of the plurality of adverse conditions.

2. The face registration controller according to claim 1, wherein the adverse condition determination unit uses a learning device that has been trained in advance to distinguish between types of the plurality of adverse conditions to identify the type of the one of the plurality of adverse conditions within which the face image obtained by the face image obtaining unit falls.

3. The face registration controller according to claim 1, wherein the adverse condition determination unit is further configured to determine whether the occupant in the face image obtained by the face image obtaining unit wears a mask, and the notification control unit is further configured to perform, when the adverse condition determination unit determines that the occupant in the face image wears the mask, at least one of:

notifying that the occupant wears the mask; and requesting the occupant to remove the mask.

4. The face registration controller according to claim 1, wherein the adverse condition determination unit is further configured to determine whether the occupant in the face image obtained by the face image obtaining unit wears an item covering a neck of the occupant, and the notification control unit is further configured to perform, when the adverse condition determination unit determines that the occupant in the face image wears the item covering the neck, at least one of:

notifying the occupant that the occupant wears the item covering the neck of the occupant; and requesting the occupant to remove the item covering the neck.

5. The face registration controller according to claim 1, wherein the adverse condition determination unit is further configured to determine whether the occupant in the face image obtained by the face image obtaining unit wears sunglasses, and the notification control unit is further configured to perform, when the adverse condition determination unit determines that the occupant in the face image wears the sunglasses, at least one of:

notifying the occupant that the occupant wears the sunglasses; and requesting the occupant to remove the sunglasses.

6. The face registration controller according to claim 1, wherein the adverse condition determination unit is further configured to:

determine whether a face of the occupant in the face image obtained by the face image obtaining unit is cast in a shadow and identify a shaded area of the face, and the notification control unit is further configured to, when the adverse condition determination unit determines that the face is cast in the shadow, perform at least one of:

notifying the occupant that the face in the face image is cast in the shadow;

notifying the occupant of the shaded area of the face; and requesting the occupant to remove an object between the imaging device and the face of the occupant.

7. The face registration controller according to claim 1, wherein the adverse condition determination unit is further configured to determine whether the face image obtained by the face image obtaining unit includes blown-out highlights, and the notification control unit is further configured to perform, when the adverse condition determination unit determines that the face image includes blown-out highlights, at least one of:

notifying the occupant of the blown-out highlights; and requesting the occupant to use a sun visor to block an external light.

8. The face registration controller according to claim 1, wherein the adverse condition determination unit is further configured to determine whether a face direction in the face image obtained by the face image obtaining unit falls outside of an allowable range, and the notification control unit is further configured to perform, when the adverse condition determination unit determines that the face direction in the face image falls outside of the allowable range, at least one of:

notifying the occupant that the face direction falls outside of the allowable range; and requesting the occupant to take an image with the face direction within the allowable range.

9. A face registration control method for a vehicle to register a face image of an occupant in the vehicle, the face image being used for a face authentication of the occupant, the method being executed by at least one of a processor and comprising:

obtaining the face image of the occupant that is captured by an imaging device in the vehicle;

determining whether the face image falls within one of a plurality of adverse conditions, each of the plurality of adverse conditions being a predetermined inappropriate image category for the face authentication and identifying a type of the one of the plurality of adverse conditions within which the face image falls;

notifying, when determining that the face image falls within the one of the plurality of adverse conditions, the occupant of at least one of:

the type of the one of the plurality of adverse conditions; and a solution devised in accordance with the type of the one of the plurality of adverse conditions;

registering the face image as an authentication image for the face authentication when determining that the face image does not fall within any one of the plurality of adverse conditions; and refraining from registering the face image as the authentication image when determining that the face image falls within the one of the plurality of adverse conditions.

10. A face registration controller for a vehicle comprising:

at least one of (i) a circuit and (ii) a processor having a memory storing computer program code, wherein the at least one of the circuit and the processor having the memory is configured to cause the face registration controller to:

obtain a face image of an occupant in the vehicle, the face image being captured by an imaging device in the vehicle;

determine whether the face image falls within one of a plurality of adverse conditions, each of the plurality of adverse conditions being a predetermined inappropriate image category for a face authentication and identify a type of the one of the plurality of adverse conditions within which the face image falls;

notifying, when determining that the face image falls within the one of the plurality of adverse conditions, the occupant of at least one of:

the type of the one of the plurality of adverse conditions; and a solution devised in accordance with the type of the one of the plurality of adverse conditions;

registering the face image as an authentication image used for the face authentication when determining that the face image does not fall within any one of the plurality of adverse conditions; and refraining from registering the face image as the authentication image when determining that the face image falls within the one of the plurality of adverse conditions.

* * * * *